United States Patent
Okada et al.

(10) Patent No.: US 6,849,197 B2
(45) Date of Patent: Feb. 1, 2005

(54) ICE THERMAL STORAGE MEDIUM

(75) Inventors: Masashi Okada, Tokyo (JP); Koji Matsumoto, Chofu (JP)

(73) Assignee: Tokyo Institute of Technology, Tokyo (JP)

(*) Notice: Subject to any disclaimer, the term of this patent is extended or adjusted under 35 U.S.C. 154(b) by 371 days.

(21) Appl. No.: 09/912,895

(22) Filed: Jul. 25, 2001

(65) Prior Publication Data

US 2002/0070372 A1 Jun. 13, 2002

(30) Foreign Application Priority Data

Dec. 6, 2000 (JP) ........................................ 2000-371174

(51) Int. Cl.[7] ................................................. C09K 3/18

(52) U.S. Cl. ........................................... 252/70; 252/73
(58) Field of Search ....................................... 252/70, 73

(56) References Cited

FOREIGN PATENT DOCUMENTS

| JP | 10-25470 | 1/1998 |
|---|---|---|
| JP | 10-185379 | 7/1998 |
| JP | 2000-87021 | 3/2000 |
| JP | 2000-087021 | 3/2000 |
| JP | 2000-314576 | 11/2000 |

*Primary Examiner*—Charles Boyer
*Assistant Examiner*—D G Hamlin
(74) *Attorney, Agent, or Firm*—Knobbe Martens Olson & Bear, LLP

(57) ABSTRACT

An ice thermal storage medium comprises water and a water-soluble additive, in which an amount of the additive is 1–8% by weight.

3 Claims, 4 Drawing Sheets

ICE THERMAL STORAGE MEDIUM

BACKGROUND OF THE INVENTION

1. Field of the Invention

This invention relates to an ice thermal storage medium comprising water and a water-soluble additive.

2. Description of Related Art

The ice thermal storage medium is a material containing water and serves to conduct a heat exchange around a freezing point of the resulting ice. Such an ice thermal storage medium is used in air conditioning, refrigerating, refrigerated storing, quick freezing, ice thermal storing and the like.

As such an ice thermal storage medium is used an aqueous solution added with ethylene glycol. This ice thermal storage medium is used in a dynamic type ice making called as a crystal ice or a liquid ice.

The inventors have found that the ice thermal storage medium using ethylene glycol has an advantage of enabling to continuously make granular ices, but a freezing point of the ice thermal storage medium lowers as an ice packing factor (IPF=a ratio of amount of ice formed to initial amount of aqueous solution) increases. Therefore, it has been confirmed that in order to obtain a higher ice packing factor, a refrigerating machine should be operated at a region of a low coefficient of performance (COP) by reducing an evaporation temperature in the refrigerating machine.

SUMMARY OF THE INVENTION

It is, therefore, an object of the invention to provide an ice thermal storage medium capable of realizing a higher ice packing factor at a higher freezing temperature.

According to the invention, there is the provision of an ice thermal storage medium comprising water and a water-soluble additive, in which the additive is dissolved in water to form a silanol group and included in water at an amount of 1–8% by weight.

DETAILED DESCRIPTION OF THE INVENTION

The inventors have prepared and examined various ice thermal storage mediums in order to obtain a practical ice thermal storage system.

As a result, the inventors found out that the conventional ice thermal storage medium formed by adding ethylene glycol to water increases a concentration in the solution and considerably reduces a freezing point as an amount of ice formed increases.

In the conventional ice thermal storage medium, the ice making should be carried out under a condition of low coefficient of performance by reducing the evaporation temperature in the refrigerating machine in order to obtain the higher amount of ice formed.

In the existing ice thermal storage, it is required to conduct not only peak cut and peak shift but also reduction of power used, i.e. energy saving and reduction of carbon dioxide for leveling power demand.

For this purpose, the rise of the evaporation temperature in the refrigerating machine brings about the improvement of the coefficient of performance, that is, an effect of energy saving. And also, the higher ice packing factor in the ice thermal storage is important for reducing a size of a thermal storage tank.

Under the above situation, the inventors have further investigated ice thermal storage mediums realizing a higher ice packing factor at a higher freezing temperature in detail.

As a result, the inventors found out that an ice thermal storage medium obtained by adding a silane coupling agent to water provides a higher ice-forming amount or a higher ice packing factor under an operating condition for attaining a higher coefficient of performance in the refrigerating machine and as a result, the invention has been accomplished.

In the ice thermal storage medium according to the invention, the additive forming a silanol group by dissolving in water is added, so that the silanol group forms hydrogen bond with finely formed ices.

Furthermore, in the ice thermal storage medium according to the invention, when the additive is discharged into the solution in correspondence with the formation of ice, it is bonded to ice through the silanol group, whereby it is controlled to increase the concentration of the additive in the aqueous solution and the dropping of the freezing point becomes small.

In the ice thermal storage medium according to the invention, the dropping of the freezing point is suppressed, so that the higher ice packing factor can be realized at the higher freezing temperature. By operating the refrigerating machine containing the ice thermal storage medium therein under a condition of a high coefficient of performance can be attained a more energy saving in an ice thermal storage system and also it is attempted to make small the size of the thermal storage tank owing to the higher ice packing factor.

Moreover, in the ice thermal storage medium according to the invention, the additive is bonded to the surfaces of ice particles formed through the silanol group, so that the bonding of ice particles to each other is prevented and the ice particles can be kept as they are.

BRIEF DESCRIPTION OF THE DRAWINGS

The invention will be described with reference to the accompanying drawings, wherein.

The ice thermal storage medium according to the invention comprises water and a water-soluble additive as mentioned above. The ice thermal storage medium is used in a dynamic type ice making or the like, which is called as an ice slurry or a liquid ice, and may be applied to various ice thermal storage systems.

The water-soluble additive used in the invention produces a silanol group when being dissolved in water. As such an additive, use may be made of, preferably, at least one silane coupling agent selected from the group consisting of aminopropyltriethoxysilane such as γ-aminopropyltriethoxysilane or the like, aminopropyltrimethoxysilane such as γ-aminopropyltrimethoxysilane or the like, aminopropyl-aminopropylmethyldimethoxysilane such as N-β-(aminoethyl)γ-aminopropylmethyldimethoxysilane or the like, aminoethyl-aminopropyl-trimethoxysilane such as N-β-(aminoethyl)γ-aminopropyltrimethoxysilane or the like, and aminoethyl-aminopropyltriethoxysilane such as N-β-(aminoethyl)γ-aminopropyltriethoxysilane or the like.

All of these silane coupling agents have a high solubility to water and an excellent storage stability.

Among these silane coupling agents, it is preferable to use at least one of γ-aminopropyltriethoxysilane and γ-aminopropyltrimethoxysilane.

The additive according to the invention is included in water at an amount of 1–8% by weight. If the amount is less than 1% weight, the addition effect is small and the freezing is apt to be generated in a wall face. Further, the resulting ices can not keep the dispersion state and are apt to form a lump, and also it is anticipated to reduce the fusing rate in the fusion and further it is considered that the lump makes a flowing resistance in the carriage to increase the carrying power. If the amount exceeds 8% by weight, the silanol group using in the hydrogen bond to the resulting ices becomes excessive and the effect corresponding to the addition amount is not obtained and as a result, this is uneconomical. Moreover, the particle size of the resulting ices becomes too small and it is anticipated to reduce the fusing rate in the fusion.

In the invention, it is preferable to include 2–4% by weight of the additive into water. Within this range, almost all of water content may be frozen with a very small dropping of the freezing point of about 3–7° C., so that it is possible to considerably improve COP and the effect corresponding to the addition amount is obtained and hence this is economical. Furthermore, the particle size of the resulting ices becomes an appropriate size, and the dispersion state is kept over a long time and it is anticipated to increase the fusing rate in the fusion.

The silane coupling agent according to the invention such as aminopropyltriethoxysilane, aminopropyltrimethoxysilane or the like is water-soluble and is subjected to hydrolysis with water to form a silanol group(—SiOH). The silanol group forms a hydrogen bond with the resulting ice.

Figure 1:
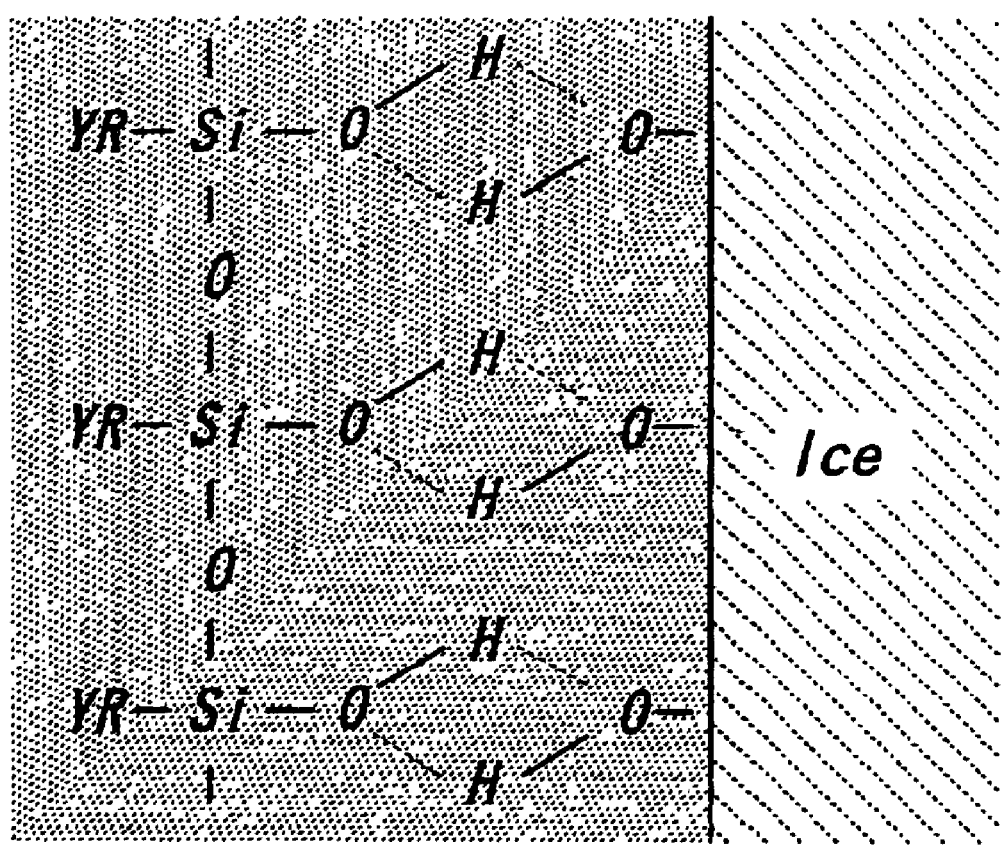
FIG. 1 is a model diagram illustrating bond between ice and silanol group according to the invention.

A model of such a hydrogen bond is shown in FIG. 1. As shown in FIG. 1, a rule of the additive according to the invention is assumed as follows; that is, the ices are covered with the additive and the like by bonding the silanol group to the surfaces of the ices produced and polymerizing the coupling agents each having an organic functional group to each other. The molecule of the silane coupling agent has an organic functional group —Y such as an amino group or the like on the other side. Moreover, R is an appropriate alkyl group or the like.

In the ice-making course using the conventional ice thermal storage medium such as aqueous solution of ethylene glycol, the concentration in the solution increases in accordance with the amount of the ice produced, and the freezing point of the solution drops, so that the ice packing factor can not be increased unless the evaporation temperature is decreased in the refrigerating machine.

In the ice thermal storage medium according to the invention, the silanol group bonds to ices in the ice-making course, so that the dropping of the freezing point is suppressed by the additive and hence the actual ice-making amount is larger than the ice-making amount calculated from a relation between concentration and freezing point.

In the ice thermal storage medium according to the invention can be adopted various ice-making processes under various conditions. For example, there are used an ice-making machine with an agitator or an ice-making machine provided in its tube with a cooler as shown in FIGS. 2 and 3.

Figure 2:
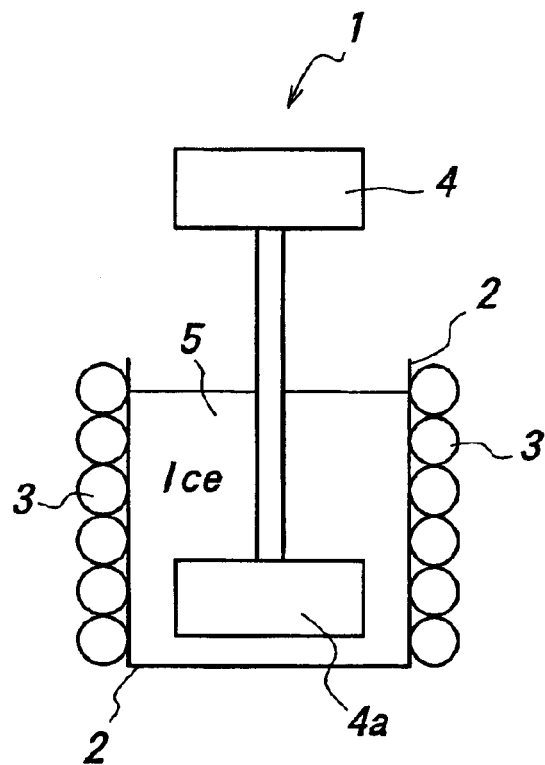
FIG. 2 is a schematic view of an embodiment of the ice-making machine provided in its inside with an agitator according to the invention.

The ice-making machine 1 shown in FIG. 2 comprises a bottomed cooling cylinder 2, a cooling tube 3 arranged on an outside of the cooling cylinder, and an agitator 4, in which ice-making is carried out while agitating an ice thermal storage medium 5 in the cooling cylinder 2 with an agitating blade 4a of the agitator 4.

Figure 3:
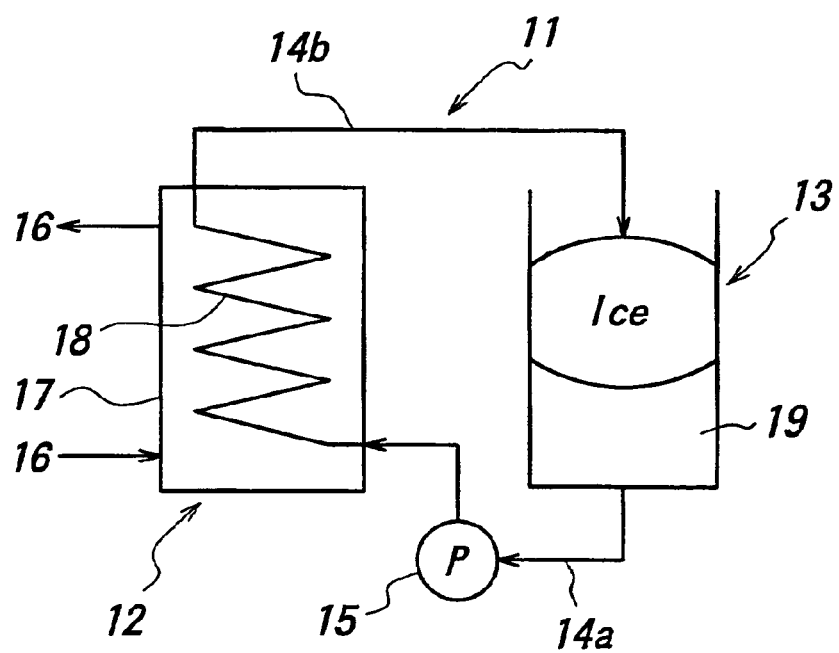
FIG. 3 is a schematic view of an embodiment of the ice-making machine provided in its tube with a cooler according to the invention.

The ice-making machine 11 shown in FIG. 3 comprises an ice-making part 12, an ice-storing part 13, tubes 14a and 14b communicating the ice-making part 12 and the ice-storing part 13, and a pump 15, in which ice-making is carried out by cooling an ice thermal storage medium 19 in a tube 18 by means of a heat exchanger 17 using a low temperature brine or low temperature refrigerant 16, or by cooling the ice thermal storage medium into a super-cooled state by means of the heat exchanger 17 and making ices outside the tube 18.

The invention will be described with reference to the following examples and comparative example.

EXAMPLE 1

The ice-making is carried out by using an aqueous solution of 4% by weight of γ-aminopropyltriethoxysilane as an ice thermal storage medium with the ice-making machine as shown in FIG. 2.

Figure 4:
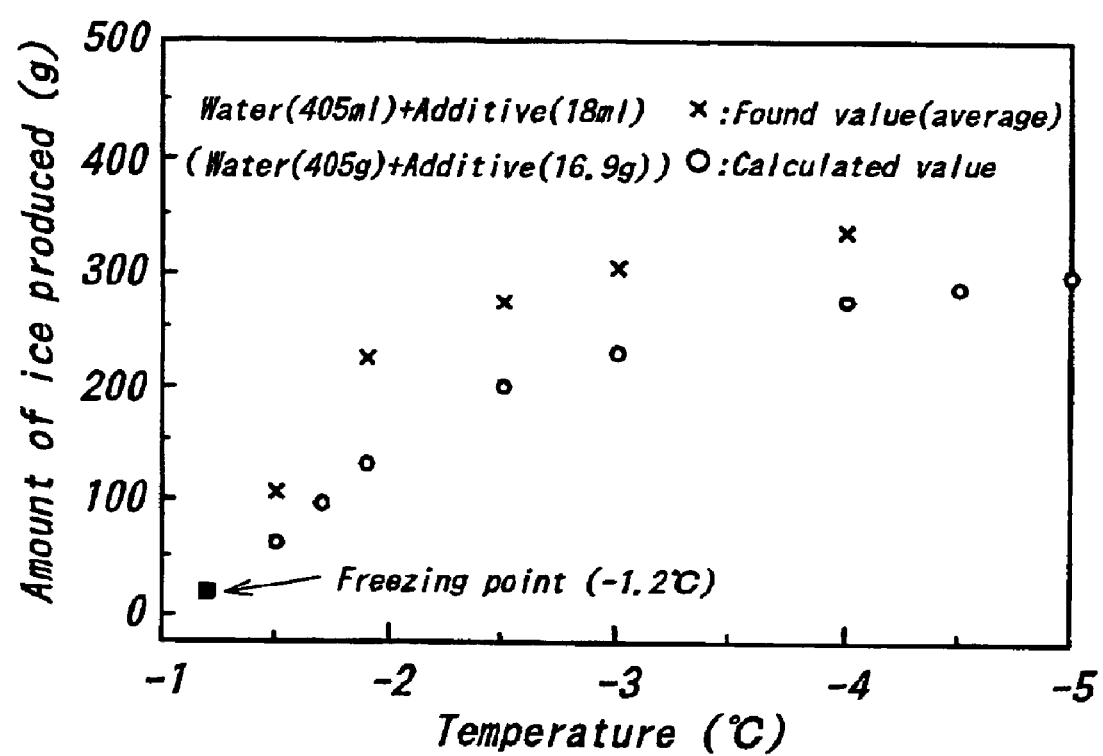
FIG. 4 is a graph showing an ice-making amount in an example according to the invention.

In this case, the ice-making is promoted as shown in FIG. 4, and as the freezing point drops, the ice-making amount found (x) is made larger by 20–40% than the ice-making amount calculated from the freezing point of a phase diagram (○).

Figure 5:
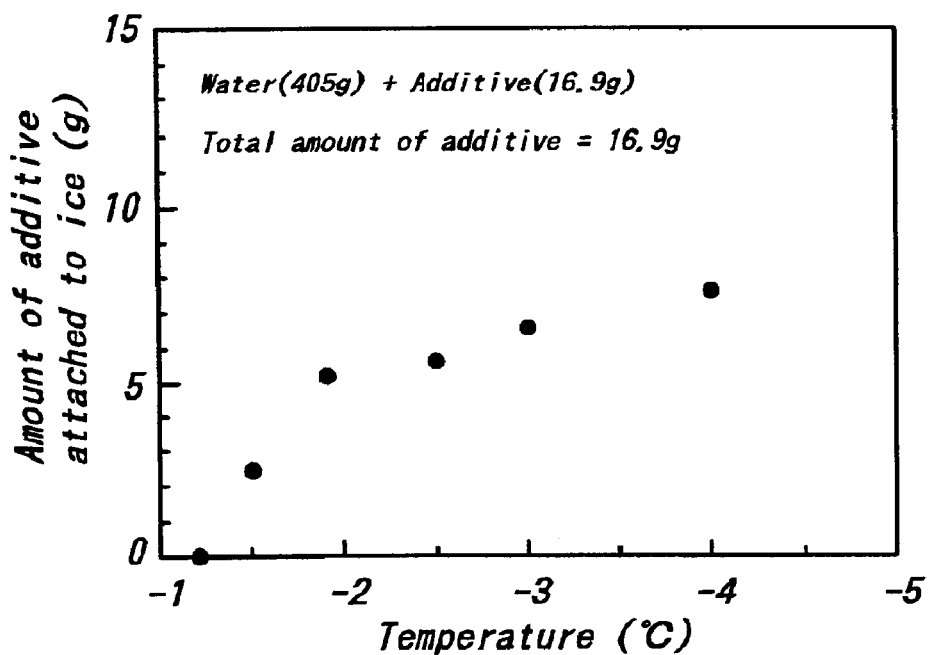
FIG. 5 is a graph showing an amount of an additive bonded to ice in an example according to the invention.

And also, the amount of the additive bonded to ice is shown in FIG. 5 in relation to the temperature. In FIG. 5, 50% of the additive is bonded to ices at −4° C. and hence the rise of the concentration of the additive in the solution is suppressed during the ice-making. The IPF at −4° C. [=(mass of ices)/(mass of water+mass of additive)] is not less than 80%.

EXAMPLE 2

The same procedure as in Example 1 is repeated except that γ-aminopropyltrimethoxysilane is used as an additive instead of γ-aminopropyltriethoxysilane of Example 1.

In this case, the result similar to Example 1 is obtained.

COMPARATIVE EXAMPLE

The ice-making is carried out by using an aqueous solution of ethylene glycol as an additive having the same concentration as in Example 1 (4% by weight) in the ice-making machine shown in FIG. 3.

Figure 6:
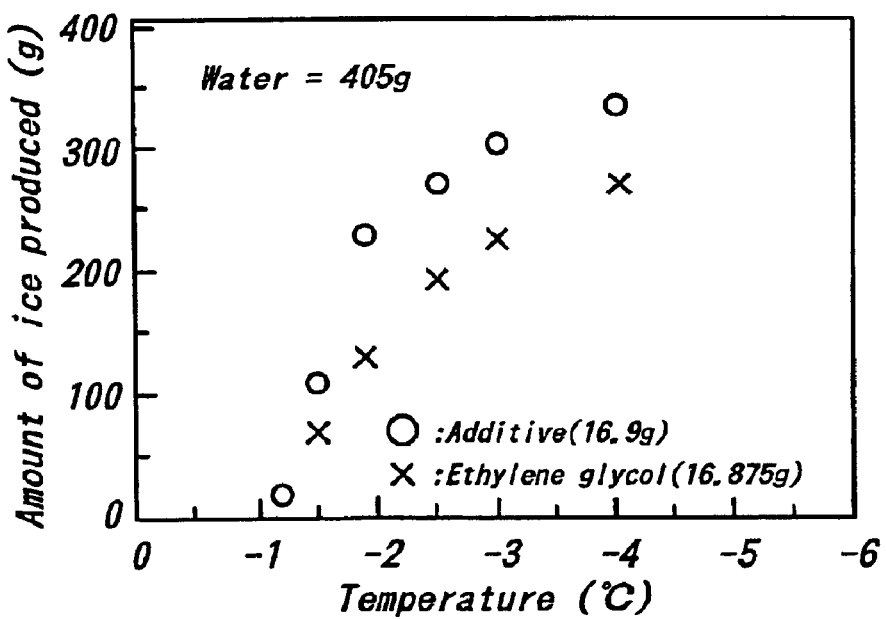
FIG. 6 is a graph showing a comparison between an ice-making amount in an example according to the invention and an ice-making amount in a case that an aqueous solution of ethylene glycol is cooled to form ices.

The calculated result of the ice-making amount is shown in FIG. 6 in comparison with the ice-making amount of Example 1. As seen from FIG. 6, the ice-making amount through the ice thermal storage medium of Example 1 at −4° C. (○) becomes larger by not less than 20% than that (x) through the aqueous solution of ethylene glycol. From this result, it is understood that the higher IPF is obtained through the ice thermal storage mediums of Examples 1 and 2.

As mentioned above, when using the ice thermal storage medium according to the invention, the dropping of the freezing point resulted from the formation of ice is suppressed and the higher IPF can be obtained, so that the refrigerating machine can be run under the condition of higher COP.

What is claimed is:

1. An ice thermal storage medium comprising water and a water-soluble additive, wherein the additive is dissolved in water to form a silanol group and included in water in an amount of 1–8% by weight, and the additive is at least one silane coupling agent selected from the group consisting of aminopropyltrimethoxysilane, aminoethyl-aminopropylmethyldimethoxysilane, aminoethyl-aminopropyltrimethoxysilane and aminoethyl-aminopropyltriethoxysilane.

2. An ice thermal storage medium according to claim 1, wherein the silane coupling agent is γ-aminopropyltrimethoxysilane.

3. An ice thermal storage medium according to claim 1, wherein the amount of the additive is 2–4% by weight.

* * * * *